United States Patent
Schurle et al.

(10) Patent No.: US 10,267,024 B2
(45) Date of Patent: Apr. 23, 2019

(54) INTERMEDIATE HOLDER

(71) Applicant: Neoperl GmbH, Mullheim (DE)

(72) Inventors: Holger Schurle, Mullheim (DE);
Alexander Stein, Ihringen (DE); Elmar Mock, Colombier NE (CH); Markus Mast, Bern (CH); Andrew Hirniak, Zurich (CH); Naomi Bitmead, Bremgarten b. Bern (CH)

(73) Assignee: NEOPERL GMBH, Mullheim (DE)

( * ) Notice: Subject to any disclaimer, the term of this patent is extended or adjusted under 35 U.S.C. 154(b) by 113 days.

(21) Appl. No.: 15/109,269

(22) PCT Filed: Feb. 3, 2015

(86) PCT No.: PCT/EP2015/000203
§ 371 (c)(1),
(2) Date: Jun. 30, 2016

(87) PCT Pub. No.: WO2015/135615
PCT Pub. Date: Sep. 17, 2015

(65) Prior Publication Data
US 2017/0009436 A1    Jan. 12, 2017

(30) Foreign Application Priority Data
Mar. 11, 2014  (DE) .................. 20 2014 002 258 U (51) Int. Cl.
*E03C 1/086* (2006.01)
*F16L 15/00* (2006.01)
*F16L 15/08* (2006.01)

(52) U.S. Cl.
CPC ............. *E03C 1/086* (2013.01); *F16L 15/008* (2013.01); *F16L 15/08* (2013.01)

(58) Field of Classification Search
CPC ......... E03C 1/086; F16L 15/008; F16L 15/08; Y10T 137/9464; Y10T 137/8807
(Continued)

(56) References Cited

U.S. PATENT DOCUMENTS

| 6,378,912 B1 * | 4/2002 | Condon | .................... F16L 5/06 239/273 |
| 7,644,876 B2 | 1/2010 | Weis et al. | |

(Continued)

FOREIGN PATENT DOCUMENTS

| DE | 3344614 | 6/1985 |
| DE | 202007007667 | 11/2007 |

(Continued)

*Primary Examiner* — Michael R Reid
(74) *Attorney, Agent, or Firm* — Volpe and Koenig, P.C.

(57) ABSTRACT

The invention relates to an intermediate holder (3) which on the external circumference thereof has at least one holding means (5) for fastening the intermediate holder (3) in a water outlet (4) of a sanitary outlet fitting (1), and on the internal circumference thereof at least one fastening means (6) for releasably fastening a sanitary functional unit (2). One approach to a solution according to the invention provides that the intermediate holder (3) is manufactured from one material strip and the holding means and fastening means (5, 6) of said intermediate holder (3) are configured as formed lugs of the material strip that at the one lug end of said lugs by way of a bent region are connected to the material strip and that by way of the opposite other free lug end of said lugs protrude beyond the circumference of the material strip.

14 Claims, 5 Drawing Sheets

(58) Field of Classification Search
USPC ..... 137/801, 615; 4/675–678; 285/338, 340, 285/291.2, 292.1
See application file for complete search history.

(56) References Cited

U.S. PATENT DOCUMENTS

| | | | | |
|---|---|---|---|---|
| 2005/0040650 | A1* | 2/2005 | Chang | F16B 7/0413 |
| | | | | 285/340 |
| 2008/0115357 | A1* | 5/2008 | Li | F04C 18/0215 |
| | | | | 29/888.022 |
| 2012/0325928 | A1* | 12/2012 | Gransow | B05B 1/16 |
| | | | | 239/8 |

FOREIGN PATENT DOCUMENTS

| | | |
|---|---|---|
| DE | 102006057206 | 6/2008 |
| WO | 2004038112 | 5/2004 |

* cited by examiner

Fig. 12

INTERMEDIATE HOLDER

BACKGROUND

The invention relates to an intermediate holder which has at least one holding element for fastening the intermediate holder in a water outlet of a sanitary outlet fitting, and at least one fastening means for releasably fastening a sanitary functional unit.

It is already known that the use of a mouthpiece may be dispensed with by using an intermediate holder for inserting a jet regulator or similar sanitary functional units into sanitary outlet fittings. It is furthermore known that fixing the sanitary functional units in such sanitary fittings is enabled by using an intermediate holder for inserting sanitary functional units into sanitary outlet fittings, without said sanitary fittings having to be machined in time-consuming and cost-intensive operational steps such as milling a suitable thread into the water outlet.

A sleeve-shaped intermediate holder by way of which a sanitary functional unit designed as an insert cartridge may be releasably fastened in a sanitary outlet fitting is already known from EP 1 554 438 B1. The intermediate holder has the property of sealing in an encircling manner the sanitary functional unit designed as an insert cartridge in relation to the intermediate holder, and the intermediate holder in relation to the internal circumferential wall of the outlet fitting. Two annular seals are thus required, this entailing the disadvantage that leakages between the intermediate holder and the outlet fitting or between the intermediate holder and the insert cartridge, respectively, may arise in certain circumstances. Moreover, the use of two annular seals means a higher cost input.

A sleeve-shaped intermediate holder is also disclosed in DE 10 2006 057 206 B4. A sanitary functional unit which here is configured as a jet regulator is conjointly plug-fitted with a sleeve into the water outlet of a sanitary outlet fitting. The sleeve-shaped intermediate holder has barbs which by means of axial displacement of the functional unit in relation to the intermediate holder engage in a radial manner in the internal wall of the water outlet and in this manner guarantee fastening of the intermediate holder in the water outlet of the sanitary outlet fitting. However, the known intermediate holder likewise has the already mentioned disadvantage that two annular seals are required in order for the annular zones between the intermediate holder and the outlet fitting, on the one hand, and between the intermediate holder and the functional unit, on the other hand, to be sealed. In order for the annular seal which has to seal the annular zone between the sleeve-shaped intermediate holder and the water outlet to be attached, a corresponding groove on the intermediate holder is moreover required, so as to guarantee for the annular seal to be disposed on the external circumference of the intermediate holder. This represents the further disadvantage of corresponding machining of the intermediate holder, having corresponding cost and time inputs.

An adapter for connecting a water outlet fitting having a circular connector cross section to a water outlet having a non-standard connector cross section, for example an oval connector cross section, is disclosed in DE 33 44 614 A1. The adapter here has an external clamping sleeve which encloses an internal conical sleeve, the clamping sleeve and the conical sleeve being provided with sliding faces which bear on one another and which lie at an angle in relation to the central axis.

A sanitary outlet fitting having a water outlet and a jet regulator which is assigned to the water outlet is disclosed in DE 20 2007 007 667 U1, said jet regulator having a jet-regulator housing with installed parts located therein.

SUMMARY

There therefore exists the object of achieving an intermediate holder of the type mentioned at the outset, which allows functionally reliable fastening of a jet regulator or of another sanitary insert part in the water outlet of a sanitary outlet fitting, the manufacturing of said intermediate holder at the same time being possible with a reduced input.

An achievement according to the invention of this object in the case of the intermediate holder of the type mentioned at the outset in particular lies in that the intermediate holder is manufactured from one material strip and the holding means and fastening means of said intermediate holder are configured as formed lugs of the material strip that, at the one lug end of said lugs by way of a bent region, are connected to the material strip and that, by way of the opposite other free lug end of said lugs, protrude beyond the circumference of the material strip. It may further be expedient for an annular seal to be provided between the sanitary functional unit and the internal circumference of the water outlet of the sanitary outlet fitting, and for the outflow-side end periphery of the intermediate holder in the flow direction to be disposed ahead of the annular seal.

The intermediate holder according to the invention has at least one holding means which serves for fastening the intermediate holder in a water outlet of a sanitary outlet fitting. The intermediate holder further has at least one fastening means which serves for releasably fastening a sanitary functional unit which is introduced or inserted into the intermediate holder. For example, the sanitary functional unit may be a filter screen, a flow-rate regulator or a flow-rate limiter, a jet regulator, or the combination of at least two of the aforementioned components which is configured for example as an insert cartridge or an insert unit.

The intermediate holder according to the invention is manufactured from one material strip which has an open or closed annular shape. In this material strip, the holding means and fastening means are configured as formed lugs of the material strip. The formed lugs which serve as holding means or as fastening means at one lug end thereof by way of a bent region are connected to the material strip, while said formed lugs by way of the opposite free other lug end thereof protrude beyond the circumference of the material strip. Such an intermediate holder which is manufactured from one material strip may be manufactured with minor input and allows for simple and rapid fastening of a sanitary functional unit in the water outlet of a sanitary outlet fitting.

It is expedient for an annular seal to be provided between the sanitary functional unit and the internal circumference of the water outlet of the sanitary outlet fitting, and for the outflow-side end periphery of the intermediate holder in the flow direction to be disposed ahead of the annular seal. In this embodiment according to the invention, preferably only a single annular seal is provided between the sanitary functional unit and the internal circumference of the water outlet of the sanitary outlet fitting, the outflow-side end periphery of the intermediate holder in the flow direction being disposed ahead of the annular seal. According to this preferred embodiment, the annular seal effectively prevents leakage flows which also compromise the outflow jet pattern of a sanitary functional unit and which could flow past in the annular zone between the intermediate holder and the internal circumference of the outlet fitting, or in the annular zone between the intermediate holder and the external circumference of the sanitary functional unit.

Here, simple and cost-effective manufacturing of the intermediate holder according to the invention is further facilitated if the material strip used for manufacturing the intermediate holder according to the invention is configured as an annular sheet-metal plate. Such an annular sheet-metal strip may not only be manufactured by way of simple punching and forming procedures, but the holding means and fastening means may rather be incorporated into this sheet-metal strip by precisely such punching and forming procedures. Upon having carried out these punching and forming procedures, the intermediate holder configured as an annular sheet-metal plate has sufficient hardness and dimensional stability in order for said intermediate holder to be reliably anchored in the water outlet, on the one hand, and in order for said intermediate holder to receive the sanitary functional unit.

The intermediate holder according to the invention may have a circular annular cross section. However, manufacturing of the intermediate holder according to the invention may even be additionally facilitated if the material strip is formed by way of a plurality of plate-shaped material-strip segments of which mutually adjacent material-strip segments are connected by way of a material-strip bending zone which is oriented so as to be approximately axially parallel with the intermediate-holder longitudinal axis.

The intermediate holder according to the invention may have a rounded geometry. However, an embodiment in which the intermediate holder has a polygonal shape is preferable. One particularly advantageous embodiment according to the invention provides that the material-strip segments in the mutual position thereof approximate a round intermediate-holder cross section. To this end, the intermediate holder may be formed from one material strip having twelve material-strip segments, for example, said material-strip segments being shaped to form a round intermediate-holder cross section.

The holding means required for fastening the intermediate holder in the water outlet of a sanitary outlet fitting may be distributed across the entire external circumference of the intermediate holder. It is also possible for the holding means to be provided on the external circumference of the intermediate holder in those positions in which on the side of the internal circumference the fastening means that are configured as threaded portions for fastening the sanitary functional unit are provided. It is also possible for the fastening means for the sanitary functional unit that are disposed on the side of the internal circumference to be disposed so as to be offset to the holding means on the side of the external circumference. Combinations of an offset and an identical arrangement of the fastening means and of the holding means on the internal side and on the external side of the intermediate holder are also possible.

One preferred embodiment according to the invention provides that of the material-strip segments at least one material-strip segment supports at least one fastening means, and at least one material-strip segment supports at least one holding means.

However, an embodiment in which of mutually adjacent material-strip segments in each case the one material-strip segment supports at least one fastening means, and the other material-strip segment supports at least one holding means is preferred.

One advantageous refinement according to the invention lies in that at least one material-strip segment supports a group of formed lugs which is formed from a plurality of fastening means or of holding means, preferably from two or three fastening means or holding means.

Here, firm retention and also simple manufacturability of the intermediate holder according to the invention is further facilitated when the formed lugs of at least one material-strip segment that form a group are disposed on a line which is axially parallel with the intermediate-holder longitudinal axis.

In order for releasing of the intermediate holder in the water outlet of the sanitary outlet fitting to be prevented while the functional unit is being screwed into the intermediate holder, it is advantageous when the free end periphery of at least one formed lug which is specified as a holding means that is disposed on that lug end that faces away from the bent region is disposed in the screwing-in direction of the internal thread and preferably transversely thereto. Particularly simple manufacturing of the intermediate holder according to the invention is enabled when the formed lugs are configured as punched features and are preferably manufactured by trilateral punched features in the material strip.

One preferred exemplary application according to the invention provides that the sanitary insert unit is configured as a jet regulator or has a jet regulator.

BRIEF DESCRIPTION OF THE DRAWINGS

Refinements according to the invention are derived from the claims in conjunction with the figures and from the description. The invention will be described in yet more detail hereunder by means of one preferred exemplary embodiment. In the drawings:

DETAILED DESCRIPTION OF THE PREFERRED EMBODIMENTS

Figure 1:
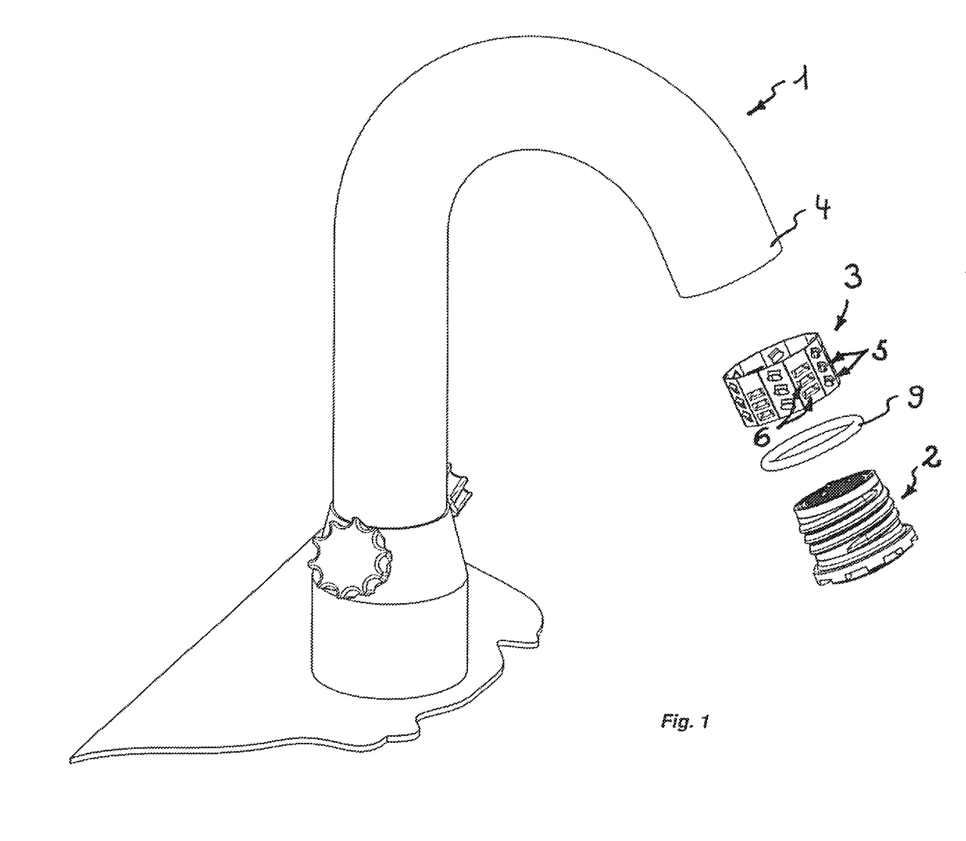
FIG. 1 shows a sanitary outlet fitting having a sanitary functional unit which by way of an annular intermediate holder is to be fastened in the water outlet of the sanitary outlet fitting, wherein the outlet fitting, the intermediate holder, the sanitary functional unit, and an annular seal which is specified for sealing are shown in an exploded view of individual parts.
Figure 2:
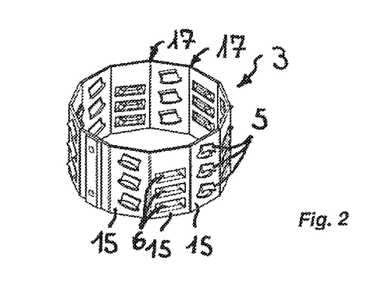
FIG. 2 shows the intermediate holder from FIG. 1, in a perspective view shown from the inflow side.
Figure 3:
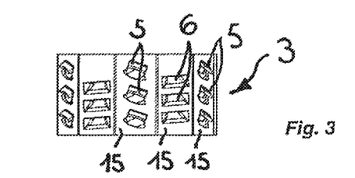
FIG. 3 shows the intermediate holder from FIGS. 1 and 2, in a side view.
Figure 4:
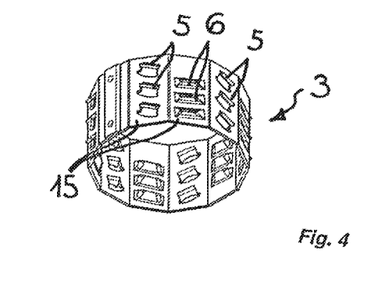
FIG. 4 shows the intermediate holder from FIGS. 1 to 3, in a perspective view shown from the outflow side.
Figure 5:
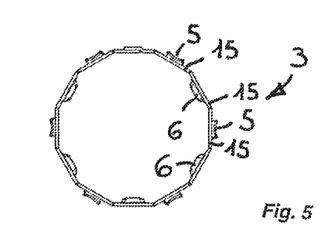
FIG. 5 shows the intermediate holder from FIGS. 1 to 4, in a plan view onto the inflow-side end periphery.
Figure 6:
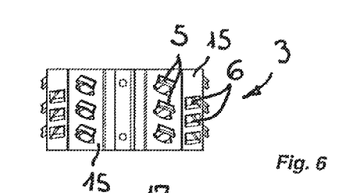
FIG. 6 shows the intermediate holder from FIGS. 1 to 5, in a side view which in relation to FIG. 3 is rotated.
Figure 7:
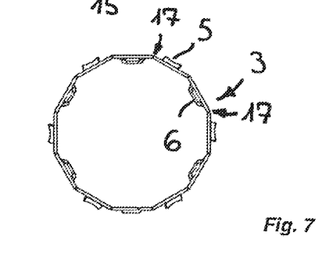
FIG. 7 shows the intermediate holder from FIGS. 1 to 6, in a plan view onto the outflow-side end periphery.
Figure 8:
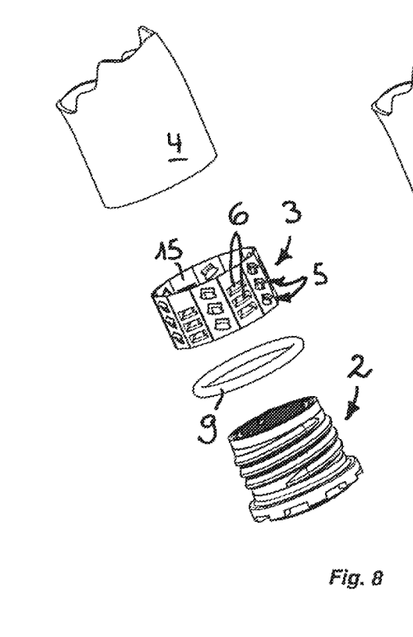
FIGS. 8 to 11 show the individual assembly steps required for fastening with the aid of the intermediate holder according to FIGS. 1 to 7 a sanitary functional unit in the water outlet of a sanitary outlet fitting.
Figures 9, 10:
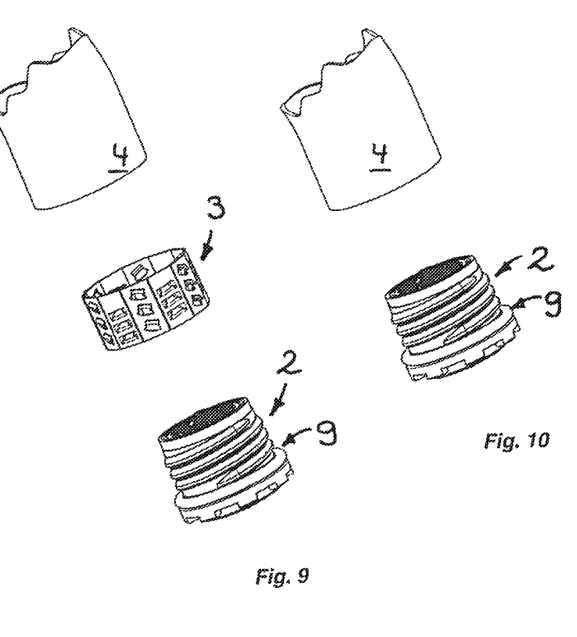
Figure 11:
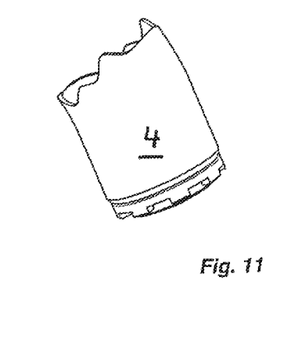
Figure 12:
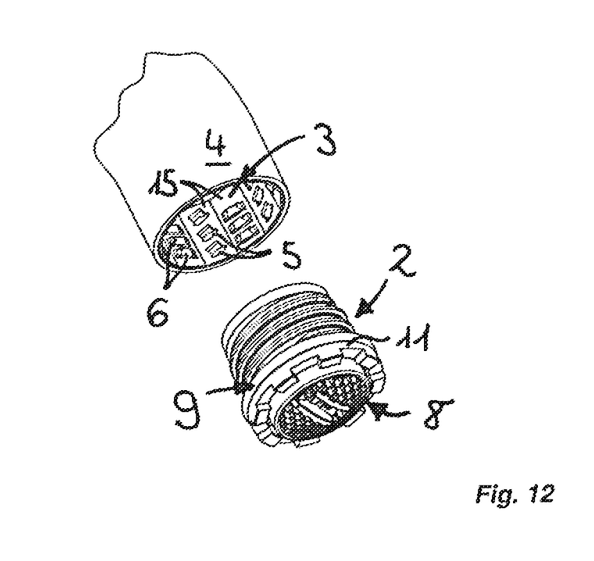
FIG. 12 shows the intermediate holder anchored in the water outlet, prior to the sanitary functional unit being screwed in or inserted.
Figure 13:
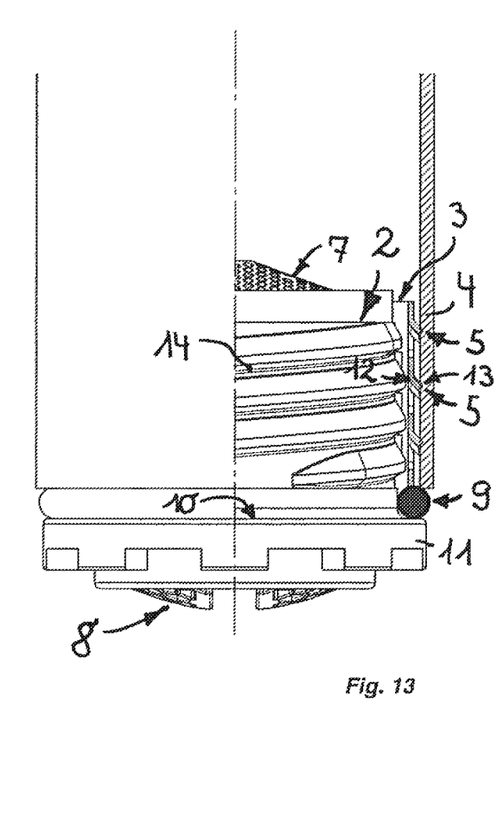
FIG. 13 shows the outlet fitting in FIG. 1 which is shown in a partial longitudinal section, in the region of the water outlet of the former, the sanitary functional unit being anchored with the aid of the intermediate holder according to FIGS. 1 to 12 in the water outlet.
Figure 14:
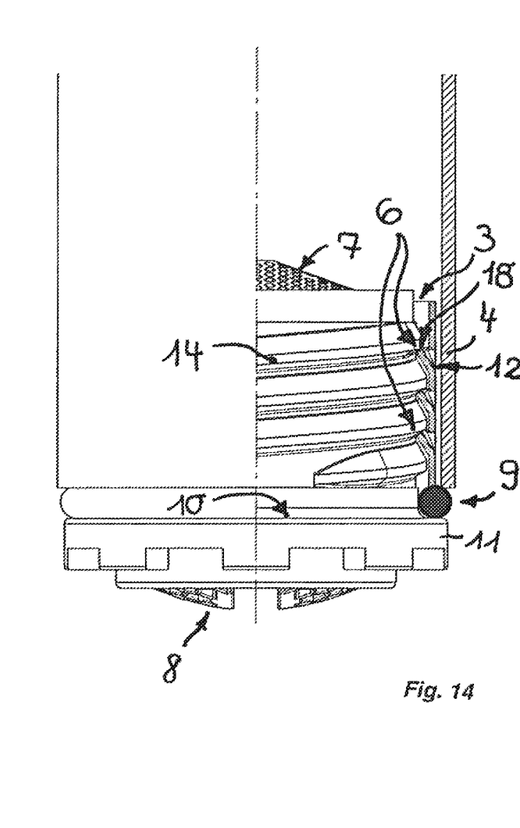
FIG. 14 shows the water outlet supporting inside thereof the functional unit, in a partial longitudinal section which in relation to FIG. 13 is rotated.

A sanitary outlet fitting 1 having a sanitary functional unit 2 which by way of an annular intermediate holder 3 is to be fastened in the water outlet 4 of the sanitary outlet fitting 1 is illustrated in FIG. 1. The intermediate holder 3, on the external circumference thereof, has at least one holding means 5 which serves for fastening the intermediate holder 3 in the water outlet 4 of the sanitary outlet fitting 1. The intermediate holder 3, on the internal circumference thereof, further has at least one fastening means 6 which serves for releasably fastening a sanitary functional unit 2 which is introduced or inserted into the intermediate holder 3. For example, the sanitary functional unit 2 may be a filter screen 7, a flow-rate regulator or a flow-rate limiter, a jet regulator 8, or the combination of at least two of the aforementioned components which is designed as an insert cartridge or insert unit, for example. Only one single annular seal 9 is preferably provided between the sanitary functional unit 2 and the internal circumference of the water outlet 4 of the sanitary outlet fitting 1, the outflow-side end periphery of the intermediate holder 3 in the flow direction being disposed ahead of the annular seal 9. In order to be able to place the annular seal 9 on a part-region of the functional unit 2 that protrudes beyond the intermediate holder 3, an annular groove may be provided on the external circumference of the functional unit 2. In the case of the exemplary embodiment illustrated here, the annular seal 9 is placed between the intermediate holder 3 and an annular shoulder 10, the latter being formed by an annular flange 11 which on the outflow-side end periphery of the functional unit 2 protrudes on the side of the external circumference. The annular seal 9 effectively prevents leakage flows which also compromise the outflow jet pattern of the functional unit 2 and which could flow past in the annular zone between the intermediate holder 3 and the internal circumference of the outlet fitting 1, or in the annular zone between the intermediate holder 3 and the external circumference of the sanitary functional unit 2.

The intermediate holder 3 is manufactured from one material strip. In this material strip, the holding means and fastening means 5, 6 are configured as formed lugs of the material strip. The formed lugs which serve as holding means or fastening means 5, 6, at the one lug end thereof by way of a bent region 12, are connected to the material strip while said formed lugs by way of the opposite free other lug end 13, 18 thereof protrude beyond the circumference of the material strip. Such an intermediate holder 3 which is manufactured from one material strip may be manufactured with minor input and allows for simple and rapid fastening of the functional unit 2 in the water outlet 4 of the sanitary outlet fitting 1.

In order for the intermediate holder 3 to be able to be manufactured in as simple and cost-effective a manner as possible, this intermediate holder here is configured as an annular sheet-metal plate. Such an annular sheet-metal strip may not only be manufactured by way of simple punching and forming procedures, but the holding means and fastening means 5, 6 may rather be incorporated into this sheet-metal strip by precisely such punching and forming procedures. Upon having carried out these punching and forming procedures, the intermediate holder 3 configured as an annular sheet-metal plate has sufficient hardness and dimensional stability in order for said intermediate holder 3 to be reliably anchored in the water outlet 4 of the sanitary outlet fitting 1, on the one hand, and in order for said intermediate holder 3 to receive the sanitary functional unit 2 in a fixed and durable manner, on the other hand.

In order for fixed and durable retention of the sanitary functional unit 2 in the annular intermediate holder 3 to be facilitated, and in order to be able to release the sanitary functional unit 2 from the intermediate holder 3 again upon demand and to replace the former or to remove the former for cleaning purposes, for example, that lug end 18 of the at least one formed lug that is specified as a fastening means 6 that protrudes beyond the internal circumference of the material strip is configured as a portion of a turn of an internal thread. Here, the internal thread is specified for an external thread 14 on the external circumference of the sanitary functional unit 2.

In order to be able to readily anchor the intermediate holder 3 in the water outlet 4 of the sanitary outlet fitting 1, that lug end 13 of the at least one formed lug that is specified as a holding means 5 that protrudes beyond the material-strip external circumference is configured as a fastening claw. In order for unintentional releasing of the intermediate holder 3 in the water outlet 4 to be avoided while the functional unit 2 is being screwed into the fastening means 6 of the intermediate holder 3, the at least one formed lug 5 which is designed as a fastening claw is provided for friction-locking fastening on the side of the internal circumference on the water outlet 4 of the sanitary outlet fitting 1. That free lug end 13 of the formed lug 5 that serves as a fastening claw is oriented so as to be transverse to the screwing-in direction of the internal thread provided on the internal circumference of the intermediate holder 3, and by way of the free periphery thereof said free lug end 13 pointing in the screwing-in direction.

The intermediate holder 3 may be manufactured from plastics material. However, an embodiment in which the intermediate holder 3 is manufactured from a metallic material, in particular from a corrosion-resistant metallic material, is preferred. Here, the intermediate holder 3 is formed from a plurality of plate-shaped material-strip segments 15 of which mutually adjacent material-strip segments 15 are connected by way of a material-strip bending zone 17 which is oriented so as to be approximately axially parallel with the intermediate-holder longitudinal axis. These material-strip segments 15 in the mutual position thereof approximate a round intermediate-holder cross section. Of the mutually adjacent material-strip segments 15 in each case the one material-strip segment 15 supports at least one fastening means 6, and the other material-strip segment 15 supports at least one holding means 5. It can be seen in FIGS. 2 to 7 that at least one material-strip segment 15 supports a group of formed lugs which is formed from a plurality of fastening means 6 or of holding means 5, preferably from two or three fastening means 6 or holding means 5. Here, the formed lugs of at least one material-strip segment 15 that form a group are disposed on a line which is disposed so as to be axially parallel with the intermediate-holder longitudinal axis.

The formed lugs of the intermediate holder 3 illustrated here are configured as punched features and are manufactured by trilateral punched features in the sheet-metal strip forming the intermediate holder 3.

The individual steps required for fastening a sanitary functional unit 2 in the water outlet 4 of a sanitary outlet fitting 1 are shown in FIGS. 8 to 11. To this end, the intermediate holder 3 by screwing the sanitary functional unit 2 into the intermediate holder 3 is initially connected thereto. In order for sealing between the internal wall on the water outlet 4 of the sanitary outlet fitting 1 and the sanitary functional unit 2 to be guaranteed, the annular seal 9 which is preferably manufactured from an elastic material is push-fitted onto the sanitary functional unit 2 beforehand. The assembly formed from the functional unit 2, the annular seal 9, and the intermediate holder 3 may be readily prefabricated and subsequently thereto for the intended use thereof needs only to be inserted into the water outlet 4 of the sanitary outlet fitting 1. Further exemplary embodiments (not illustrated here) provide that the functional unit 2 is connected to the intermediate holder 3 by a clamping, latching, or plug-in connection or the like. In order for the functional unit 2 to be fastened in the intermediate holder 3, further exemplary embodiments (not shown here) provide that the functional unit is held in the intermediate holder 3 by clamping, latching, or plug-in connections.

LIST OF REFERENCE SIGNS

1 Sanitary outlet fitting
2 Functional unit
3 Intermediate holder
4 Water outlet
5 Holding means
6 Fastening means
7 Filter screen
8 Jet regulator
9 Annular seal
10 Annular shoulder
11 Annular flange
12 Bent region
13 Lug end (protruding outward)
14 External thread
15 Material-strip segment
17 Material-strip bending zone
18 Lug end (protruding inward)

The invention claimed is:

1. An intermediate holder (3) comprising
one material strip including a plurality of holding elements (5) for fastening the intermediate holder (3) in a water outlet (4) of a sanitary outlet fitting (1), and a plurality of fastening elements (6) for releasably fastening a sanitary functional unit (2), the holding elements and the fastening elements (5, 6) are configured as lugs formed in the material strip that are connected at one lug end of said lugs by way of a bent region to the material strip and that by way of an opposite other free lug end of said lugs protrude from a circumference of the material strip wherein said other free lug end of the formed lug that forms the fastening element (6) protrudes inwardly from an internal circumference of the material strip, the plurality of fastening elements (6) together comprise a plurality of circumferentially and axially spaced fastening elements which define an internal thread matingly engagable with an external thread of the sanitary functional unit (2).

2. The intermediate holder as claimed in claim 1, wherein said other free lug end of the at least one formed lug that forms the holding element (5) protrudes outwardly from a material-strip external circumference and forms a fastening claw.

3. The intermediate holder as claimed in claim 2, wherein the at least one formed lug which forms the fastening claw is provided for friction-locking fastening on a side of an internal circumference of the water outlet (4) of the sanitary outlet fitting (1).

4. The intermediate holder as claimed in claim 1, wherein the intermediate holder (3) is formed by the material strip which comprises a plurality of plate-shaped material-strip segments (15) of which mutually adjacent material-strip segments (15) are connected by a material-strip bending zone (17) which is oriented approximately axially parallel with a longitudinal axis of the intermediate-holder.

5. The intermediate holder as claimed in claim 4, wherein the material-strip segments (15) in a mutual position thereof approximate a round intermediate-holder cross section.

6. The intermediate holder as claimed in claim 5, wherein of the material-strip segments (15) at least one said material-strip segment (15) supports at least one of the fastening elements (6), and at least one said material-strip segment (15) supports at least one of the holding elements (5).

7. The intermediate holder as claimed in claim 4, wherein of mutually adjacent ones of the material-strip segments (15) in each case a first adjacent one of said material-strip segments (15) supports at least one of the fastening elements (6), and a second adjacent one of said material-strip segments (15) supports at least one of the holding elements (5).

8. The intermediate holder as claimed in claim 1, wherein the material strip comprises at least one material-strip segment (15) that supports a group of formed lugs which is formed from a plurality of the fastening elements (6) or of the holding elements (6).

9. The intermediate holder as claimed in claim 8, wherein the formed lugs of the at least one material-strip segment (15) that form a group are disposed on a line which is axially parallel with a longitudinal axis of the intermediate-holder.

10. The intermediate holder as claimed in claim 1, wherein the formed lugs are configured as punched features in the material strip.

11. The intermediate holder as claimed in claim 1, wherein the sanitary functional unit (2) is configured as a jet regulator or has a jet regulator located in the intermediate holder.

12. The intermediate holder as claimed in claim 1, wherein the intermediate holder (3) is annular.

13. The intermediate holder as claimed in claim 1, wherein the at least one holding element (5) is provided on an external circumference of the intermediate holder (3).

14. The intermediate holder as claimed in claim 1, wherein the at least one fastening element (6) is provided on an internal circumference of the intermediate holder (3).

* * * * *